United States Patent
Wilke et al.

(10) Patent No.: US 7,249,756 B1
(45) Date of Patent: Jul. 31, 2007

(54) LOW-PROFILE, MULTI-AXIS, HIGHLY PASSIVELY DAMPED, VIBRATION ISOLATION MOUNT

(75) Inventors: Paul S. Wilke, Medford, OR (US); Conor D. Johnson, Belmont, CA (US)

(73) Assignee: CSA Engineering, Inc., Mountain View, CA (US)

( * ) Notice: Subject to any disclaimer, the term of this patent is extended or adjusted under 35 U.S.C. 154(b) by 67 days.

(21) Appl. No.: 11/344,487

(22) Filed: Feb. 1, 2006

(51) Int. Cl.
*F16F 3/08* (2006.01)

(52) U.S. Cl. .................. 267/152; 244/173.2; 267/153; 267/140.13

(58) Field of Classification Search ............. 244/173.2; 248/632, 634; 267/140.3, 141, 151–153; 156/169, 175; 428/219, 229
See application file for complete search history.

(56) References Cited

U.S. PATENT DOCUMENTS

| | | | | |
|---|---|---|---|---|
| 4,278,726 A | * | 7/1981 | Wieme | 428/300.7 |
| 4,942,075 A | * | 7/1990 | Hartel et al. | 428/109 |
| 5,203,435 A | * | 4/1993 | Dolgin | 188/322.5 |
| 5,358,210 A | * | 10/1994 | Simon et al. | 248/628 |
| 6,199,801 B1 | | 3/2001 | Wilke et al. | |
| 6,202,961 B1 | | 3/2001 | Wilke et al. | |
| 6,290,183 B1 | | 9/2001 | Johnson et al. | |

* cited by examiner

*Primary Examiner*—Christopher P. Schwartz
(74) *Attorney, Agent, or Firm*—Rick G. Brewster

(57) ABSTRACT

The invention disclosed is a low-profile, multi-axis, highly passively damped, vibration isolation mount which when used in multiplicity provides a complete vibration load isolation mounting system. The device provides in unique fashion a very low profile interface in combination with independently determinable compliance in all directions of vibration loading. Substantial passive damping is afforded without sacrifice to strength and linearity of behavior through adaptation of a shear wall type constrained layer damping. The result is a highly passively damped vibration isolation device that provides a very low profile interface, wide ranging longitudinal and lateral compliance management, in a durable, reliable, lightweight, and compact form.

11 Claims, 5 Drawing Sheets

LOW-PROFILE, MULTI-AXIS, HIGHLY PASSIVELY DAMPED, VIBRATION ISOLATION MOUNT

BACKGROUND OF THE INVENTION

The present invention relates to passively damped, vibration and shock load isolation apparatus suitable for use in protecting hardware and payloads from damaging vibration and shock loads, particularly those extreme loads seen in spacecraft launch systems. This application incorporates by reference all that disclosed within U.S. Pat. No. 6,202,961.

The ability to isolate payloads from the vibration and shock loading of a supporting structure or vehicle, or conversely to isolate a structure or vehicle from the vibrations of an engine, motor, or other vibration inducing payload is of great value to the aerospace, automobile and vehicle industries world wide. The particular ability to provide substantial passive damping and vibration isolation in a compact and lightweight form, together with a completely linear elastic, high-strength load path has been the strength of the device disclosed in U.S. Pat. No. 6,202,961.

A further characteristic of performance that is desired within vibration isolation devices is the ability to provide an independent and widely controllable compliance in all directions of vibration loading without sacrifice to strength and linearity of behavior, and without sacrifice to compactness or weight.

High strength and linear load-deflection performance in all directions is highly desirable to mandatory in most vibration isolation applications. For spacecraft—launch vehicle applications, large magnitude vehicle accelerations having both longitudinal and lateral directional components require that high strength be maintained in all directions. Further, the overall system dynamics of the spacecraft and launch vehicle system must be predictable and carefully controlled, thereby the demand to avoid non-linear elastomers within the load path is without compromise. Additionally, extreme loads environments drive up the size and strength requirements of the payload and payload-to-launch vehicle interface hardware, such that the mass and space requirements of the apparatus must be continuously and aggressively minimized, thereby minimizing the cascading design impact to supporting hardware.

A three-axis vibration isolation device patented earlier in part by this pair of inventors, disclosed in U.S. Pat. No. 6,290,183, provided the independently controllable, high strength, linearly elastic, multiple-axis compliance that is desired but with some sacrifice to longitudinal compactness. Damping within that device was also limited to the constrained-layer-on-beam-bending damping approach of the time, and effective primarily for longitudinal motions. Damping in the lateral directions of that device was light and thereby required any significant lateral motion damping to be added through means separate from the device.

The device of U.S. Pat. No. 6,199,801, disclosed by the present two inventors and upon which the device of U.S. Pat. No. 6,290,183 was an extension, was the first its kind to provide for a passively damped vibration isolation device with high strength and linear-elastic performance. Other earlier approaches for vibration isolation and damping implementation wherein elastomers are used in the primary load path, remain inferior to those which maintain use of high-strength, linearly elastic materials throughout the primary load path. The device of U.S. Pat. No. 6,199,801 remained relatively stiff against lateral loading as compared to its longitudinal loading and thereby did not afford the desired levels of laterally directed vibration isolation. Hence the device of U.S. Pat. No. 6,290,183 answered the need for improved lateral vibration compliance but had its own limitations in terms of higher profile and light damping.

The present invention addresses the need for a passive, highly damped vibration isolation device which provides independent and widely controllable compliance in all directions of vibration loading without sacrifice to strength and linearity of behavior, and without sacrifice to compactness or weight.

BRIEF SUMMARY OF THE INVENTION

The invention described within is a low profile, passively and highly damped, vibration isolation mount which in multiplicity provides a complete vibration load isolation mounting system. It provides an independently determinable compliance in all directions of vibration loading without sacrifice to strength and linearity of behavior, and without significant sacrifice to compactness of the payload-vehicle interface or to weight. It provides substantial damping and resulting reduction in vibration load transmission from support base to payload by utilizing the shear wall type constrained layer damping introduced in the predecessor device of U.S. Pat. No. 6,202,961.

Comprised within the assembled mount is a flexure element that is optionally of one-piece construction but may also be of assembled form. In common relationship to the disclosed vibration isolation mount, a payload attaches to an upper flexure section and a launch vehicle or support base attaches to a lower flexure section of the mount's flexure element. The position and general directional relationship of the payload relative to the launch vehicle defines the commonly understood longitudinal direction of the combined vehicle, and similarly the upper flexure section and lower flexure sections are considered generally aligned to this longitudinal direction or axis, and herein are so described. The longitudinal axis of the combined vehicle may however be defined in any direction for which loading occurs and for which vibration isolation may be desired for implementation. Thereby the description of the disclosed invention as being generally aligned to a common longitudinal axis is not to be construed as being a constraint to any space fixed axis.

The invention is further comprised of a viscoelastic material (VEM) layer which is attached to both the upper and lower flexure sections of the flexure element. Additionally, to the opposite face of the VEM layer, a relatively stiff constraining layer is attached that spans between the upper and lower flexure sections of the flexure element.

Particular attributes of the flexure element and damping application combine to affect a vibration isolation mount of novel design. An aspect of the present invention retained from the referenced invention of U.S. Pat. No. 6,202,961 is the orientation of the constrained VEM layer relative to the flexure element. The VEM and constraining layers, rather than laying on the top of a flexure beam and being forced only to comply with the bent shape of that individual beam, are as described above, affixed to and across the sides of a flexure element in the manner of a shear wall. The constrained VEM thereby opposes the relative translational motion between the upper and lower flexure sections of the flexure element. The relative translational movement of the upper flexure section relative to the lower flexure section, even though minor, induces significant shear into the constrained VEM layer. With constrained VEM applied to the outer surface of the flexure element, critical damping percentages significantly greater than those of the prior art are achieved. A substantial additional increase in damping can be obtained by simply applying a constrained VEM layer to multiple locations between the upper and lower flexure sections of the flexure element.

In the invention of the referenced U.S. Pat. No. 6,202,961, the short profile of the assembled isolation mount provided substantially greater lateral stiffness, which provided advantage relative to other systems of the prior art where relatively long struts and/or viscous dampers were necessary. However, a vibration isolation device providing a lateral compliance commensurate with the longitudinal compliance was desired.

In the present invention, a well-controlled and determined lateral compliance commensurate with the longitudinal compliance is afforded. The introduction of a flexure loop section within the flexure element between the upper and lower flexure sections provides for introduction of such lateral compliance. The upper and lower flexure sections of the flexure element each provide an attachment means and an attachment proximate portion. The attachment proximate portion of the upper flexure section and the attachment proximate portion of the lower flexure section, to which the payload and vehicle respectively attach, are spaced apart longitudinally by a minimum controlled distance which is determined by the payload mass, static loads, and magnitude of vibration loads for which isolation is required. The flexure loop section connects the attachment proximate portion of the upper flexure section to that of the lower flexure section, and importantly is of such size, shape and cross section that is desired to affect the required longitudinal and lateral compliances, and is without dependence upon the minimal controlled distance between the attachment proximate portions or upon the cross section of those attachment proximate portions.

The advantage achieved by the present invention relative to the prior art is the introduction of a vibration isolation device affording particularly prescribed longitudinal and lateral compliances with significantly high passive damping, and having commensurate advantage of a very modest increase of longitudinal profile of the overall payload and vehicle. Further, through the shaping of the flexure element plan view contours, the increase in the payload's effective plan profile can be kept quite modest and allow spacecraft-to-fairing clearances to not be appreciably increased, if at all.

As with the referenced invention of U.S. Pat. No. 6,202, 961, the present invention's maintenance of a completely high-strength material load path (such as that obtained with aluminum, titanium or steel) through the flexure element provides a more durable and reliable means for connecting a payload and vehicle than that available in systems of the prior art having a lower-strength elastomer or other easily yieldable material within the load path. Additionally, linear load-versus-deflection behavior characteristics are achieved, thus providing for more straightforward and predictable dynamic characteristics than available with those systems of the prior art utilizing elastomers in the load path.

The present invention in a preferred embodiment can be utilized in multiplicity to affect a complete payload-to-vehicle vibration isolation system. To affect this system, a device is inserted into any or all mounting locations between a payload and vehicle or support structure. The attachment proximate portions of the upper and lower flexure sections lay within the fastener footprint of the payload to the support structure and the flexure loop sections lay aside of the fastener footprint.

DETAILED DESCRIPTION OF THE INVENTION

Figure 1:
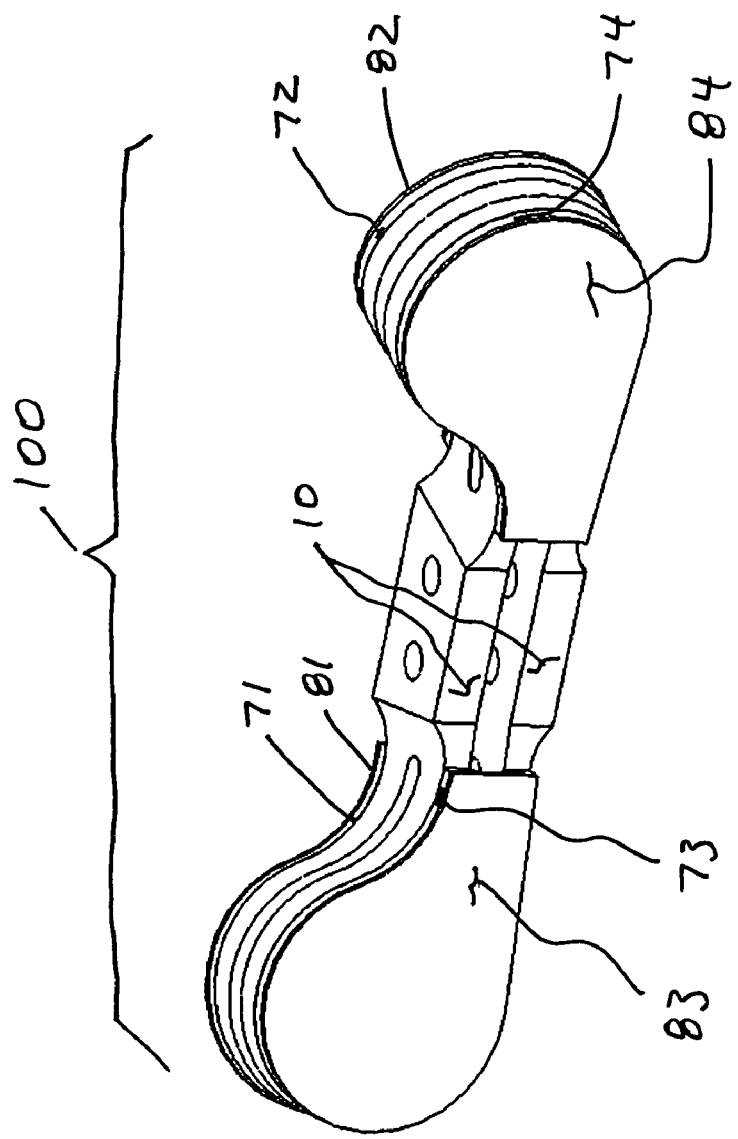
FIG. 1 is an isometric view of a low profile, multi-axis, highly passively damped, vibration isolation mount in accordance with an embodiment of the invention.
Figure 2:
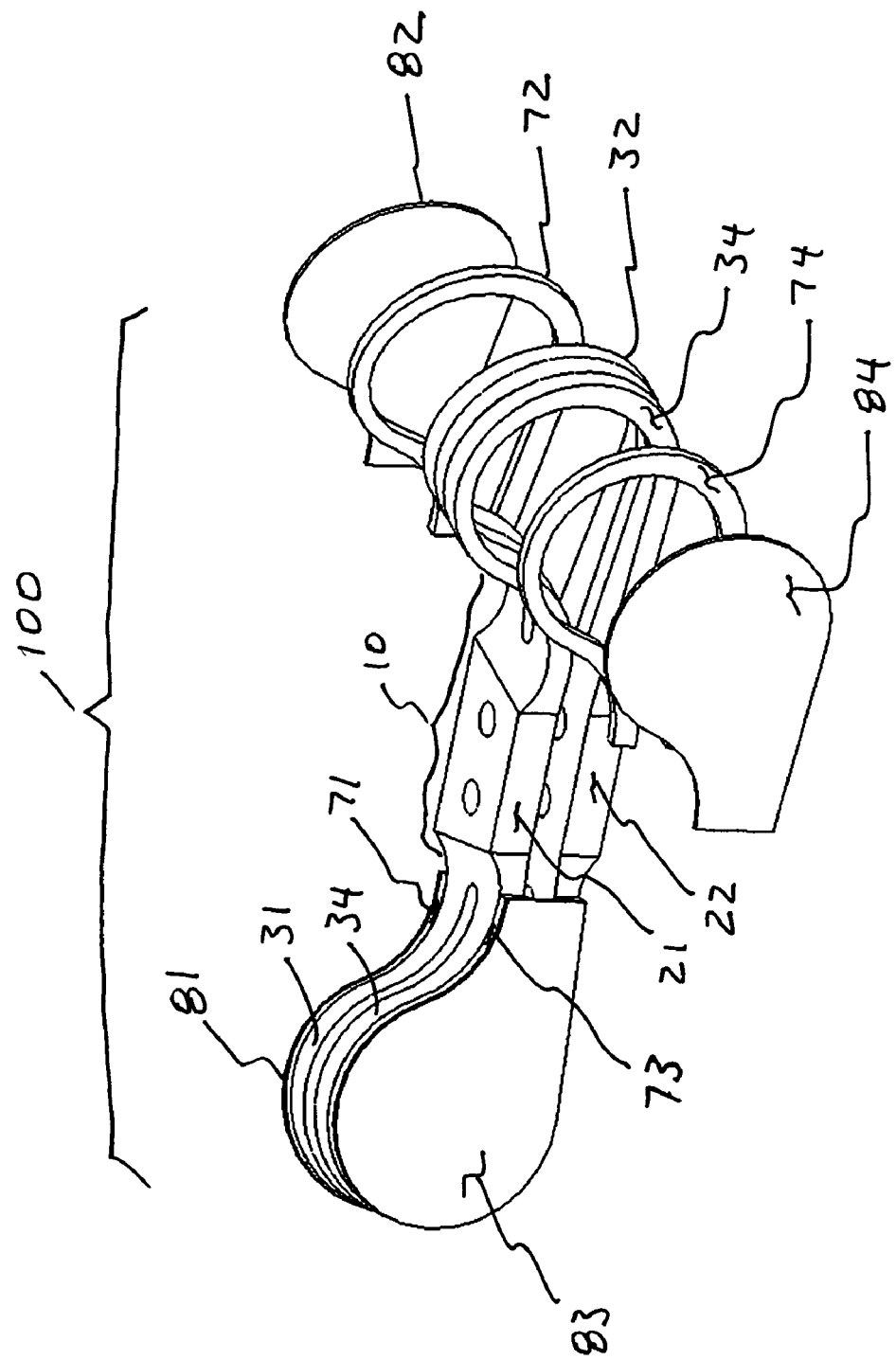
FIG. 2 is an exploded view of the vibration isolation mount of FIG. 1.

A preferred embodiment of the invention is shown in FIG. 1 and a partially exploded view of this embodiment is shown in FIG. 2. As shown in FIG. 1 the assembled vibration isolation mount 100 is comprised of a flexure element 10, VEM layers 71 through 74, and stiff constraining layers 81 through 84. For the presently described embodiment within flexure element 10, flexure loop sections 31 through 34 are also comprised and denoted.

FIG. 2 shows the relationship of the VEM and stiff constraining layers relative to the flexure element 10. In the exploded portion of the view, VEM layer 72 is seen on one of its faces to attach to flexure loop section 32. In the present embodiment VEM layer 72 is cut and shaped to match the shape of the flexure loop section 32. Constraining layer 82 attaches to the opposite face of the VEM layer 72 and spans across the flexure loop section 32 so that motion of the upper flexure section relative to the lower flexure section causes shearing of the VEM layer 72.

For the embodiment shown, similar VEM and constraining layers, VEM elements 71, 73, and 74 and constraining layers 81, 83, and 84 are applied to the other three flexure loop sections 31, 33, and 34.

Figure 3:
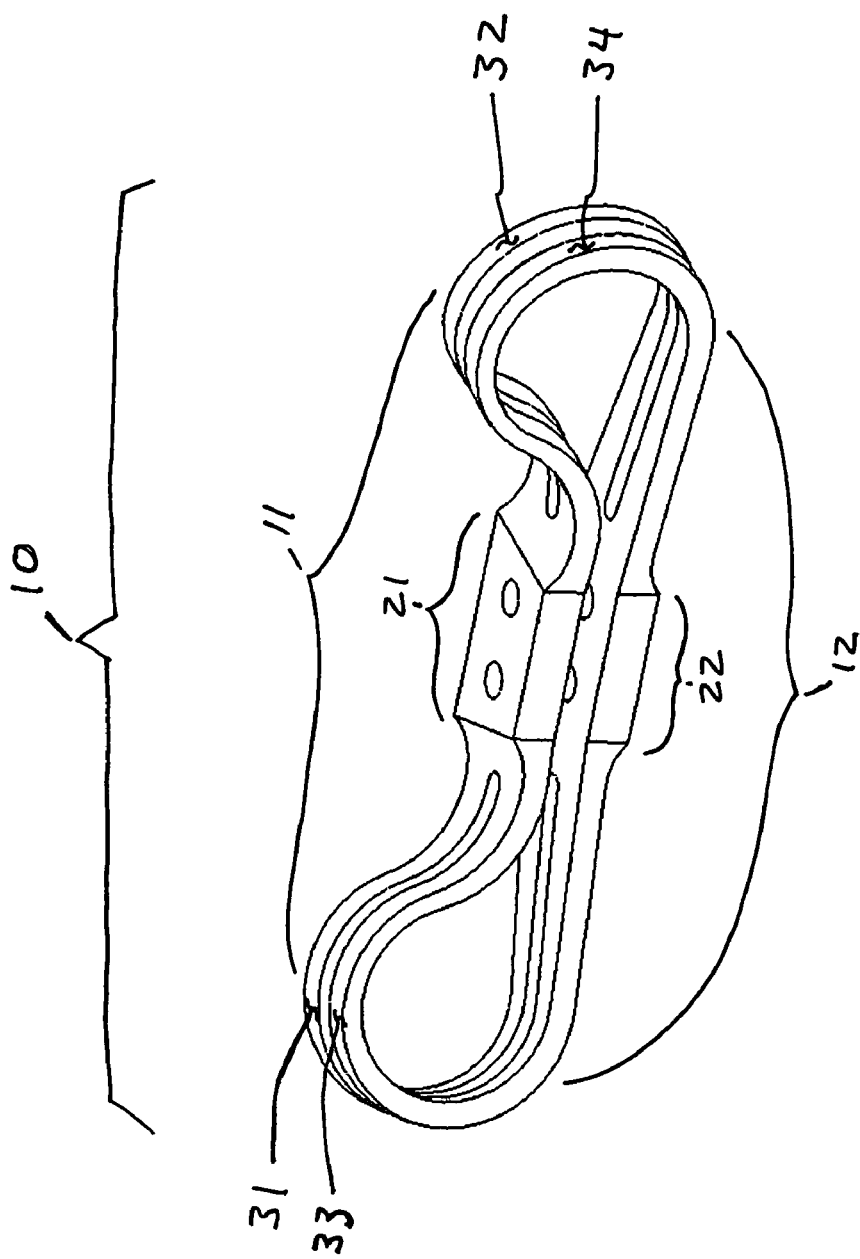
FIG. 3 is an isometric view of the flexure element comprised within the vibration isolation mount of FIG. 1.

FIG. 3 shows the flexure element 10 alone as configured within the isolation mount 100. The flexure element 10 is further comprised of upper and lower flexure sections 11 and 12 with each having attachment means and attachment proximate portions 21 and 22. Spanning between the upper and lower flexure sections 11 and 12 are the flexure loop sections 31 through 34 as seen in FIG. 3 and denoted previously within FIGS. 1 and 2. As seen within FIG. 3, the flexure element 10 of this preferred embodiment is of one-piece construction, and therein the flexure loop sections 31 through 34 transition smoothly and jointlessly into the attachment proximate portions 21 and 22 of the upper and lower flexure sections 111 and 12, respectively.

As seen in FIG. 3, the attachment proximate portion 21 of the upper flexure section 11 is spaced a relatively small distance from the attachment proximate portion 12 of the lower flexure section 22. This small spacing is free to be set at a minimal controlled distance so to allow the very low profile attribute of the isolation mount 100, yet still provide the necessary amount of longitudinal motion required of the payload relative to the support structure for vibration isolation.

The flexure loop sections, which may be theoretically as little as one, or more commonly placed in pairs spaced symmetrically about the attachment proximate portions of the upper and lower flexure sections, can be varied in size, shape, and cross section independently from the attachment proximate portions of the upper and lower flexure sections and independently from the minimal controlled distance between the attachment proximate portions. This characteristic of the invention provides the freedom and means to introduce both longitudinal and lateral compliances in sufficient and commensurate degree such that vibration isolation can be comparably achieved in all axes of motion.

The flexure element 10 through its incorporation of the flexure loop sections, allows both longitudinal and lateral motion of the upper flexure section 11 relative to the lower flexure section 12. This motion is then imparted into the VEM layers 71 through 74 which are forced into shearing deformation due to the attachment of the corresponding constraining layers 81 through 84. The resulting VEM layers deformation results in significant damping to be induced for all axes of vibration.

Figure 4:
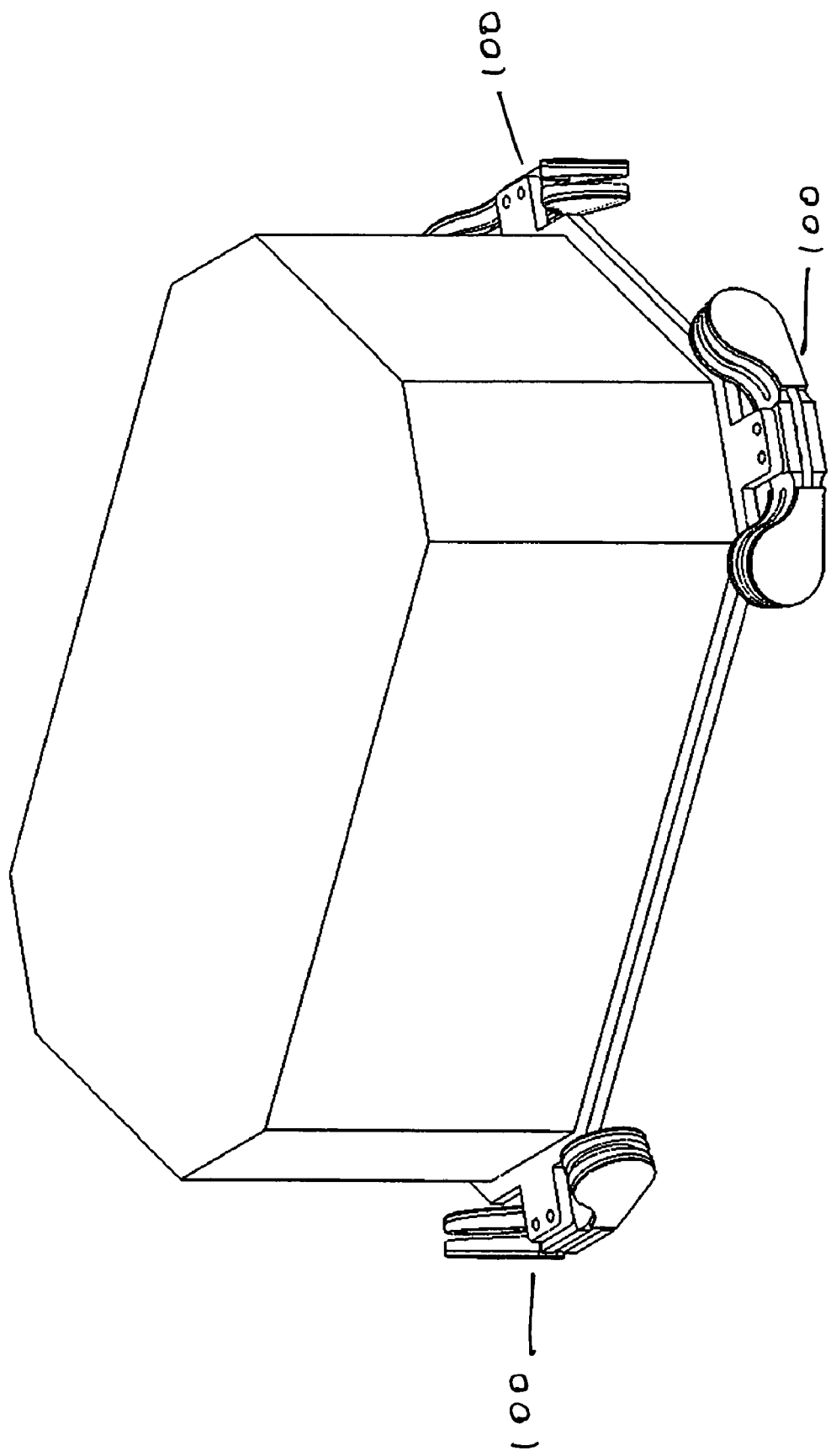
FIG. 4 is an isometric view of a vibration isolation system in accordance with an embodiment of the invention wherein multiple vibration isolation mounts of FIG. 1 are utilized to support and vibration isolate a payload from its support structure.

A preferred embodiment of a vibration isolation system is depicted in FIG. 4. Within the system four isolation mounts of the isolation mount 100 are arrayed around the perimeter of an interface flange of a payload to a support structure. The choice of number and location where the vibration isolation devices are inserted can be varied to develop the desired longitudinal and lateral compliance of the overall vibration isolation system.

Depending on the particular shape of the interface footprint between the payload and support structure or vehicle, the plan view shape of the vibration isolation device can be varied so to minimize the impact of the vibration isolation system on the overall plan profile of the payload and vehicle. Concave plan shapes of the vibration isolation devices can also be employed to allow the insertion of the vibration isolation devices such that all flexure loop sections lay outside the interface footprint.

Figure 5:
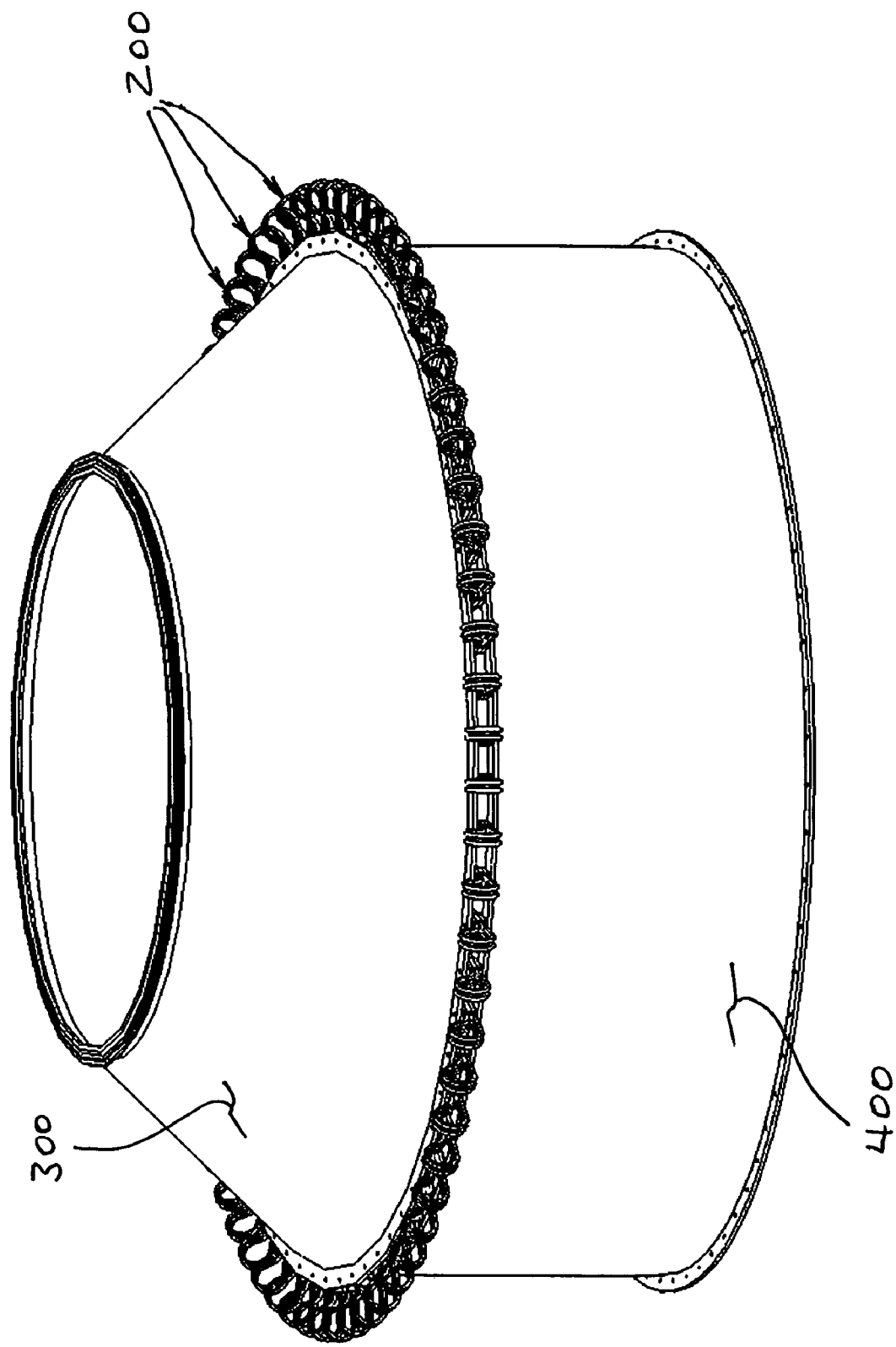
FIG. 5 is an isometric view of a cylindrical form of a vibration isolation system in accordance with an embodiment of the invention.

As shown in FIG. 5, another embodiment of the invention as a vibration isolation system utilizes many flexure devices 200 around the perimeter of a cylindrical interface between a payload 300 and support structure 400 (or launch vehicle). In this embodiment the flexure devices are mounted such that they lay in a radial array around the payload to support structure interface.

Though the attachment means shown depicted within the figures has been a two-hole fastener pattern, the attachment means can be of any type available within the mechanical arts and can be varied between the upper and lower attachment means.

The construction of the flexure element can be an assembly and is not limited to the one-piece flexure element that has been depicted. Particularly, the flexure loop sections can be detachable from the attachment proximate portions of the flexure element and thus allows for replacement or exchange of the loop sections for repair or for variation of the device compliances. Flexure loop sections of various stiffnesses can be thus interchanged for modification and refinement of the vibration isolation characteristics of the devices and the system. Varying materials may also be used between the flexure loop sections and the attachment proximate portions of the flexure element.

Within the scope of the invention, variations of the VEM layer shape, constraining layer shape, and VEM attachment location upon the flexure element may be varied for compliance variation and damping enhancement. Further, the flexure element itself or parts thereof may be of materials offering greater inherent damping, such as beryllium copper.

Within the scope of the invention, the attachment means and attachment proximate portions of the flexure element can be made of an upper array of laterally connected attachment bosses and a lower array of laterally connected attachment bosses where each boss accepts a fastener, clip or other attachment element for attaching a payload or vehicle to the isolation device. For this embodiment, each attachment boss of the upper array has a corresponding attachment boss within the lower array of attachment bosses such that the corresponding boss in the lower array is positioned longitudinally below at a minimal controlled distance. Each pair of upper and lower attachment bosses have at least one flexure loop section connecting them. Preferably the flexure loop sections are paired to affect a generally symmetric arrangement about each end of the attachment boss pair, and the flexure loop sections may further be of multiple pairs. The resulting flexure element is one of multiple, laterally displaced and connected flexure sub-elements wherein the combination of the flexure sub-elements determine the overall lateral and longitudinal stiffness of the vibration isolation device. Each flexure loop section may have attached VEM and constraining layers so to further enhance the total damping of the vibration isolation device.

In culmination the invention extends the advantageous utilization of shear wall type constrained layer damping through its combination of said damping approach with a novel flexure element that maintains a very low profile interface while affording wide ranging longitudinal and lateral compliance management. The invention further provides a vibration isolation interface in a durable, reliable, lightweight, and compact form.

The scope of the invention includes all modifications, design variations, combinations, and equivalents that would be apparent to persons skilled in this art, and the preceding description relative to particular preferred embodiments is not to be construed as exclusive of such.

We claim:

1. A vibration isolation device comprising:
   a flexure element comprising upper and lower flexure sections generally aligned to a common longitudinal axis;
   a viscoelastic material (VEM) layer having first and second facial surfaces such that the first facial surface is attached to both the upper and lower flexure sections;
   a stiff constraining layer attached to the second facial surface of the VEM layer such that motion of the upper flexure section relative to the lower flexure section is constrained by the stiff constraining layer and therein induces shearing of the VEM layer;
   wherein the upper and lower flexure sections each have an attachment means and an attachment proximate portion such that the attachment proximate portion of the upper flexure section is a minimal controlled distance from the attachment proximate portion of the lower flexure section,
   wherein the flexure element further comprises at least one flexure loop section, wherein the attachment proximate portions of the upper and lower flexure sections are connected to one another within the flexure element by the at least one flexure loop section,
   and wherein the at least one flexure loop section is of independent shape and cross section relative to the attachment proximate portions of the upper and lower flexure sections, and is of independent shape and cross section relative to the minimal controlled distance between the attachment proximate portions of the upper and lower flexure sections.

2. The device of claim 1 wherein the flexure element is comprised of high strength, linear elastic material.

3. The device of claim 1, wherein the at least one flexure loop section is comprised of multiple flexure loop sections wherein each flexure loop section attaches the attachment proximate portion of the upper flexure section to the attachment proximate portion of the lower flexure section.

4. The device of claim 3 wherein the multiple flexure loop sections are comprised of four flexure loop sections wherein two parallel loop sections connect the upper flexure section to the lower flexure section at each of two opposing ends of the upper and lower flexure sections.

5. The device of claim 3 wherein the flexure loop sections are of varying materials.

6. The device of claim 1 wherein the flexure element is an assembly wherein the at least one flexure loop section is detachable from the upper and lower flexure sections and replaceable with flexure loop sections of variable stiffness.

7. The device of claim 1 wherein the flexure element is of one-piece construction.

8. The device of claim 1 wherein the VEM layer is attached to all those surfaces of the flexure element which are aligned to the longitudinal axis, and wherein the stiff constraining layer is attached to all the VEM layer surface opposite the VEM layer surface that is attached to the flexure element.

9. The device of claim 1 wherein the attachment means and attachment proximate portions of the flexure element are comprised of an upper array of laterally connected attachment bosses and a lower array of laterally connected attachment bosses wherein each attachment boss of the upper array has a corresponding attachment boss within the lower array of attachment bosses and wherein each pair of upper and lower attachment bosses have at least one flexure loop section connecting them.

10. A vibration isolation mounting system comprising multiple devices of claim 1 wherein a device is inserted in each retained mounting location between a payload and a payload support structure.

11. The system of claim 10 wherein each isolation device has a flexure element of concave plan shape such that the attachment proximate portions of the upper and lower flexure sections of each device lay within the fastener footprint of a payload to a support structure and all the flexure loop sections of each device are positionable to the outer side of the fastener footprint.

* * * * *